(12) United States Patent
Zhou et al.

(10) Patent No.: US 12,324,455 B2
(45) Date of Patent: Jun. 10, 2025

(54) AUTOMATIC PRODUCTION LINE FOR MANUFACTURING AND PROCESSING PLANT PROTEIN MEAT

(71) Applicant: Jiangnan University, Wuxi (CN)

(72) Inventors: Jingwen Zhou, Wuxi (CN); Meng Ning, Wuxi (CN); Jian Chen, Wuxi (CN); Weizhu Zeng, Wuxi (CN); Xiaolin Liang, Wuxi (CN); Jie Chen, Wuxi (CN); Zhaojun Wang, Wuxi (CN)

(73) Assignee: Jiangnan University, Wuxi (CN)

( * ) Notice: Subject to any disclaimer, the term of this patent is extended or adjusted under 35 U.S.C. 154(b) by 785 days.

(21) Appl. No.: 17/674,924

(22) Filed: Feb. 18, 2022

(65) Prior Publication Data

US 2022/0167654 A1 Jun. 2, 2022

Related U.S. Application Data

(63) Continuation of application No. PCT/CN2021/100477, filed on Jun. 17, 2021.

(30) Foreign Application Priority Data

Jun. 19, 2020 (CN) .......................... 202010567135.1
Sep. 17, 2020 (CN) .......................... 202010979367.8

(51) Int. Cl.
*A23P 30/20* (2016.01)
*A23J 3/22* (2006.01)
(Continued)

(52) U.S. Cl.
CPC ............... *A23P 30/20* (2016.08); *A23J 3/227* (2013.01); *A23P 30/30* (2016.08); *B65G 47/90* (2013.01); *A23J 3/14* (2013.01); *A23J 3/26* (2013.01)

(58) Field of Classification Search
None
See application file for complete search history.

(56) References Cited

U.S. PATENT DOCUMENTS

| | | | |
|---|---|---|---|
| 2015/0017315 A1 | 1/2015 | Juravic et al. | |
| 2020/0138055 A1* | 5/2020 | Schein | ...................... A23J 3/14 |

FOREIGN PATENT DOCUMENTS

| | | | |
|---|---|---|---|
| CN | 102048187 A | 5/2011 | |
| CN | 104041812 A | 9/2014 | |

(Continued)

*Primary Examiner* — John J Norton
(74) *Attorney, Agent, or Firm* — IPRO, PLLC

(57) ABSTRACT

The present disclosure provides an automatic production line for manufacturing and processing plant protein meat, and belongs to the field of application of food equipment. The automatic production line for manufacturing and processing the plant protein meat comprises: an extrusion-expansion machine, plant protein meat raw material blocks, a bearing plate, a first manipulator, a storage rack, a first conveying device, a second manipulator, a second conveying device, a main console, a third conveying device, a shredding device, a seasoning adding and mixing device, a third manipulator, a recycling rack, a storage cabinet and a secondary console. The shredding device of the present disclosure shreds the plant protein meat raw material blocks by cooperative up-down staggered motion of double rows of clips, the plant protein meat raw material blocks in any shape can be shredded, and breakage of the raw material shreds in the shredding process can be avoided effectively; and by the seasoning adding and mixing device of the present disclosure, the shredded plant protein meat raw material blocks are added with seasonings and mixed with the seasonings. The present disclosure is simple in structure, facilitates manufacturing of the plant protein meat, and can efficiently produce and process the plant protein meat.

19 Claims, 9 Drawing Sheets

(51) Int. Cl.
  *A23P 30/30*  (2016.01)
  *B65G 47/90*  (2006.01)
  *A23J 3/14*  (2006.01)
  *A23J 3/26*  (2006.01)

(56) References Cited

FOREIGN PATENT DOCUMENTS

| | | | |
|---|---|---|---|
| CN | 108813639 A | | 11/2018 |
| CN | 111264681 A | * | 6/2020 |
| CN | 111345394 A | | 6/2020 |
| CN | 111631270 A | | 9/2020 |
| CN | 111745744 A | | 10/2020 |
| CN | 112056406 A | | 12/2020 |
| CN | 212787322 U | | 3/2021 |
| CN | 212814226 U | | 3/2021 |
| CN | 213281406 U | | 5/2021 |
| EP | 1437597 A1 | | 7/2004 |

\* cited by examiner

AUTOMATIC PRODUCTION LINE FOR MANUFACTURING AND PROCESSING PLANT PROTEIN MEAT

TECHNICAL FIELD

The present disclosure relates to the field of application of food equipment, and particularly relates to an automatic production line for manufacturing and processing plant protein meat.

BACKGROUND

According to data published by the United Nations Department of Economic and Social Affairs, by 2050, the world population will reach 9.7 billion, and the worldwide market demand gap on meat products will reach 38 million tons. Meat products and milk products provide 18% of calories and 37% of protein to humans, but occupy 83% of human farmland and emit 60% of agricultural greenhouse gases, causing problems such as land and water overuse, water acidification and eutrophication. To alleviate resource consumption and environmental protection pressure, multiple food enterprises worldwide begin to focus on the markets of plant protein meat.

Benefiting from social media, information globalization and increasing flexitarians, vegans and vegetarians, more and more people are aware of the value of plant proteins for environmental protection, and people are aware that climate changes may be addressed by changing dietary structure and reducing meat intake. In research of last year, one-third of the US people expressed a willingness to reduce the intake of meat products and environmentally harmful foods, and increase the intake of plant proteins.

Along with the high-speed development of the plant protein meat, the demand of machines for processing the plant protein meat is larger and larger. Most machines for processing plant protein raw materials in the current market mostly cut the raw materials into slices through blades or mince the raw materials into minced meat. These methods destroy the fiber structures of the raw materials, and greatly reduce the mouthfeel of the plant protein meat. Therefore, a machine for tearing raw materials is needed, and the fiber structures of the raw materials are not damaged while the raw materials are cut.

SUMMARY

Technical Problems

Most of existing plant protein raw material processing machines cut raw materials into slices through blades or mince the raw materials into minced meat, the raw materials cannot be torn, and the fiber structures of the raw materials are destroyed while the raw materials are cut. The fiber structures of the raw materials are destroyed, and the mouthfeel of the plant protein meat is greatly reduced.

Technical Solutions

An automatic production line for manufacturing and processing plant protein meat comprises an extrusion-expansion machine, a first conveying device, a second conveying device, a third conveying device, a shredding device and a seasoning adding and mixing device; and the third conveying device is provided with the shredding device and the seasoning adding and mixing device, a feeding opening is formed above the extrusion-expansion machine, and a discharging opening of the extrusion-expansion machine is located above the first conveying device;

the shredding device comprises a first truss, a first clip row, a second clip row, a second truss, a horizontal lead screw assembly, a sliding block, a motor, a horizontal sliding groove and clip rotating devices; and the first truss or the second truss comprises a first stand column and a second stand column; and the horizontal sliding groove is positioned on the third conveying device, and the first truss moves on the third conveying device by cooperation of the second stand column and the horizontal sliding groove; the first stand column is matched with the sliding block so that the first truss is connected to the horizontal lead screw assembly, and the horizontal lead screw assembly drives the sliding block to move in the horizontal direction by means of a motor arranged at one end of the horizontal lead screw assembly, so that the first truss is driven to move in the horizontal direction; and the two clip rotating devices are arranged, are respectively connected to the first truss and the second truss, and repeatedly move on the first truss and the second truss in the up-down direction or the left-right direction.

In an example of the present disclosure, each clip rotating device comprises a chain, gears, an electromagnetic valve and clips, there are a plurality of gears, the clips are connected to the gears, and the chain is tensioned on the gears.

In an example of the present disclosure, each clip is divided into a fixed end and a clamping end for clamping raw materials, each fixed end is embedded into the center of the corresponding gear, and each clamping end comprises an upper clamping plate and a lower clamping plate.

In an example of the present disclosure, the extrusion-expansion machine is a double-screw extrusion-expansion machine.

In an example of the present disclosure, the seasoning adding and mixing device comprises a seasoning adding mechanical arm, a brush manipulator, a pressing plate manipulator, a manipulator bearing table and seasoning tanks, the seasoning adding mechanical arm is connected to the seasoning tanks, the seasoning adding mechanical arm is used for adding seasonings into materials, the brush manipulator is used for mixing the seasonings on the materials, and the pressing plate manipulator is used for pressing the materials to mix the seasonings with the materials.

In an example of the present disclosure, the seasoning adding mechanical arm comprises a wet seasoning manipulator and a dry seasoning manipulator, the seasoning tanks comprise a wet seasoning tank and a dry seasoning tank, the wet seasoning manipulator is connected to the wet seasoning tank through a pipeline, the dry seasoning manipulator is connected to the dry seasoning tank through a pipeline, and the wet seasoning manipulator, the dry seasoning manipulator, the brush manipulator and the pressing plate manipulator are mounted on the manipulator bearing table.

In an example of the present disclosure, the automatic production line for manufacturing and processing the plant protein meat further comprises a storage cabinet, the storage cabinet is positioned below the third conveying device, the manipulator bearing table is positioned above the storage cabinet, and the seasoning tanks are positioned in the storage cabinet.

In an example of the present disclosure, the wet seasoning manipulator, the dry seasoning manipulator, the brush manipulator and the pressing plate manipulator are arranged on two sides of the third conveying device.

In an example of the present disclosure, the automatic production line for manufacturing and processing the plant protein meat comprises a storage rack, a bearing plate is stored on the storage rack, and the storage rack is divided into an upper portion and a lower portion.

In an example of the present disclosure, the automatic production line for manufacturing and processing the plant protein meat further comprises a first manipulator, and the first manipulator is used for placing the bearing plate in the storage rack onto the first conveying device.

In an example of the present disclosure, the second conveying device is connected to the third conveying device, the storage rack and the first manipulator are positioned at one end of the first conveying device, a second manipulator is arranged between the other end of the first conveying device and one end of the second conveying device, and the second manipulator is used for transferring the bearing plate conveyed to the other end of the first conveying device onto the second conveying device.

In an example of the present disclosure, the automatic production line for manufacturing and processing the plant protein meat further comprises a recycling rack and a third manipulator, the recycling rack and the third manipulator are positioned at the tail end of the third conveying device, and the third manipulator is used for placing the bearing plate conveyed to the tail end of the third conveying device onto the recycling rack.

In an example of the present disclosure, the automatic production line for manufacturing and processing the plant protein meat further comprises a main console and a secondary console, and the main console and the secondary console are positioned on one side of the third conveying device.

In an example of the present disclosure, each of the first truss and the second truss is provided with a horizontal sliding track, a horizontal sliding block, a vertical sliding groove and a vertical sliding block; and the vertical sliding groove is matched with the vertical sliding block.

In an example of the present disclosure, the clip rotating devices are connected with the vertical sliding block, the vertical sliding block moves on the first truss in the up-down direction through the vertical sliding groove, and the horizontal sliding blocks are connected to the first truss and the second truss respectively through the horizontal sliding tracks.

In an example of the present disclosure, the gears connected to the first clip row are engaged with one another, and the gears connected to the second clip row are engaged with one another.

In an example of the present disclosure, electromagnets are separately arranged on the upper clamping plates and the lower clamping plates of the clamping ends of the clips.

In an example of the present disclosure, a sharp corner is arranged at the front end of each lower clamping plate.

In an example of the present disclosure, the included angle between the inclined plane of each sharp corner and the bottom face of the corresponding lower clamping plate is 30°.

Beneficial Effects

In the present disclosure, by mutual cooperation of the double-screw extrusion-expansion machine, the shredding device, the seasoning adding and mixing device, the conveying devices and the manipulators, production, shredding and seasoning adding of plant protein meat raw material blocks are achieved, and the fiber structure of the meat is not destroyed while the plant protein meat raw material blocks are shredded quite well. Meanwhile, raw materials and auxiliary materials are mixed, and then are processed into plant protein meat in a specific shape. The present disclosure is reasonable in structure, simple and convenient to mount and simple to operate, the plant protein meat raw material blocks can be efficiently produced and processed, and the plant protein meat raw material blocks are shredded. In the shredding process, breakage of raw material shreds and destroying to the fiber structures of the raw materials can be effectively avoided, and finally, the raw material shreds are added with seasonings and are mixed with the seasonings.

Figure 1:
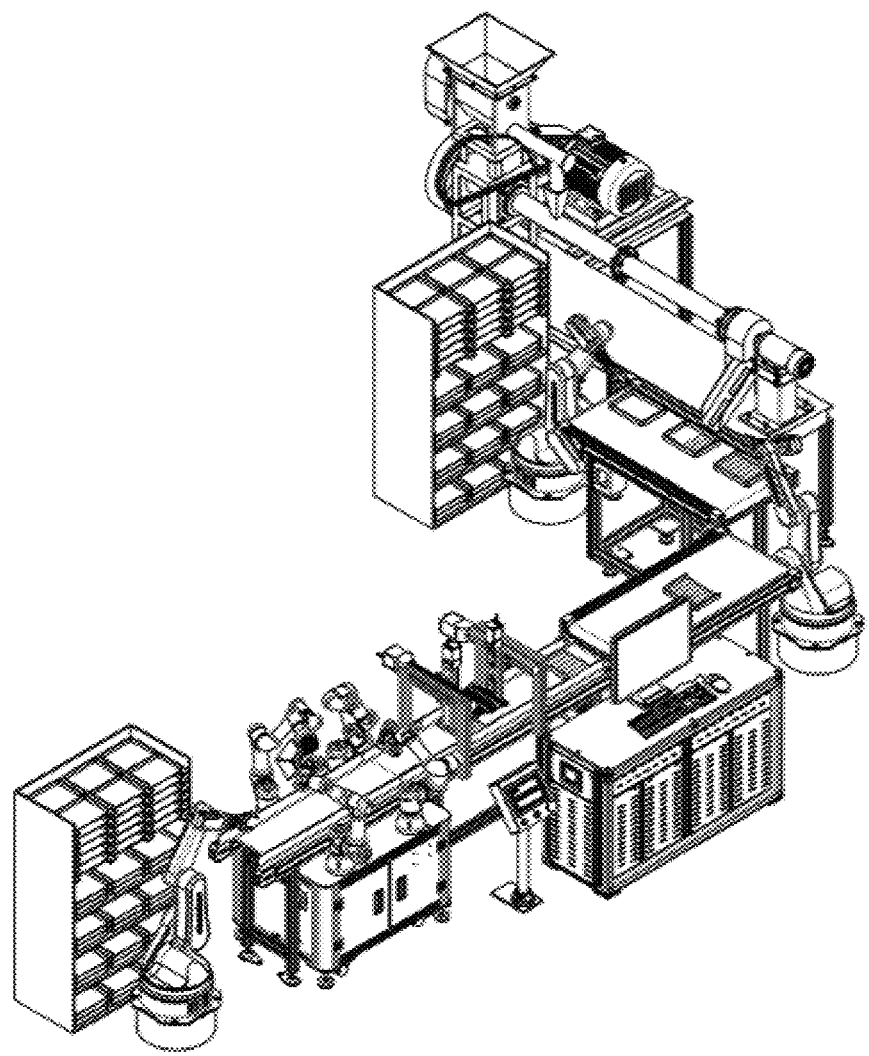
FIG. 1 is a general schematic view of Example 1.

In figures: 1—extrusion-expansion machine; 2—feeding opening; 3—discharging opening; 4—plant protein meat raw material block; 5—bearing plate; 6—first conveying device; 7—first manipulator; 8—storage rack; 9—second manipulator; 10—second conveying device; 11—main console; 12—third conveying device; 13—shredding device; 14—seasoning adding and mixing device; 17—storage cabinet; 18—secondary console; 19—first truss; 20—first clip row; 21—second clip row; 22—second truss; 23—horizontal lead screw assembly; 24—sliding block; 25—motor; 26—horizontal sliding groove; 27—first stand column; 28—horizontal sliding track; 29—horizontal sliding block; 30—vertical sliding groove; 31—vertical sliding block; 32—second stand column; 33—chain; 34—gear; 35—electromagnet; 36—clip; 37—wet seasoning manipulator; 38—dry seasoning manipulator; 39—brush manipulator; 40—pressing plate manipulator; 41—manipulator bearing table; 42—third manipulator; 43—recycling rack; and 44—seasoning tank.

DETAILED DESCRIPTION

The present disclosure is further described below in detail in combination with drawings and examples.

The structures, the proportions, the sizes, and the like as drawn in the drawings of the present specification are only used to corporate with the disclosure of the present specification in order to facilitate the understanding and reading of those skilled in the art, and are not intended to limit the conditions under which the present disclosure can be implemented, and thus are not technically meaningful. Any modification of the structure, change of the proportional relationship or adjustment of the size should fall within the scope of the technical content disclosed by the present disclosure without affecting the obtainable effects and the achievable purposes of the present disclosure. At the same time, the terms such as "upper", "lower", "left", "right", "middle" as used in the present specification are only for convenience of description and are not intended to limit the implementation scope of the present disclosure, and the change or adjustment of the relative relationship is considered to be within the implementation scope of the present disclosure under the condition of no substantial change to the technical contents.

Example 1

Figure 2:
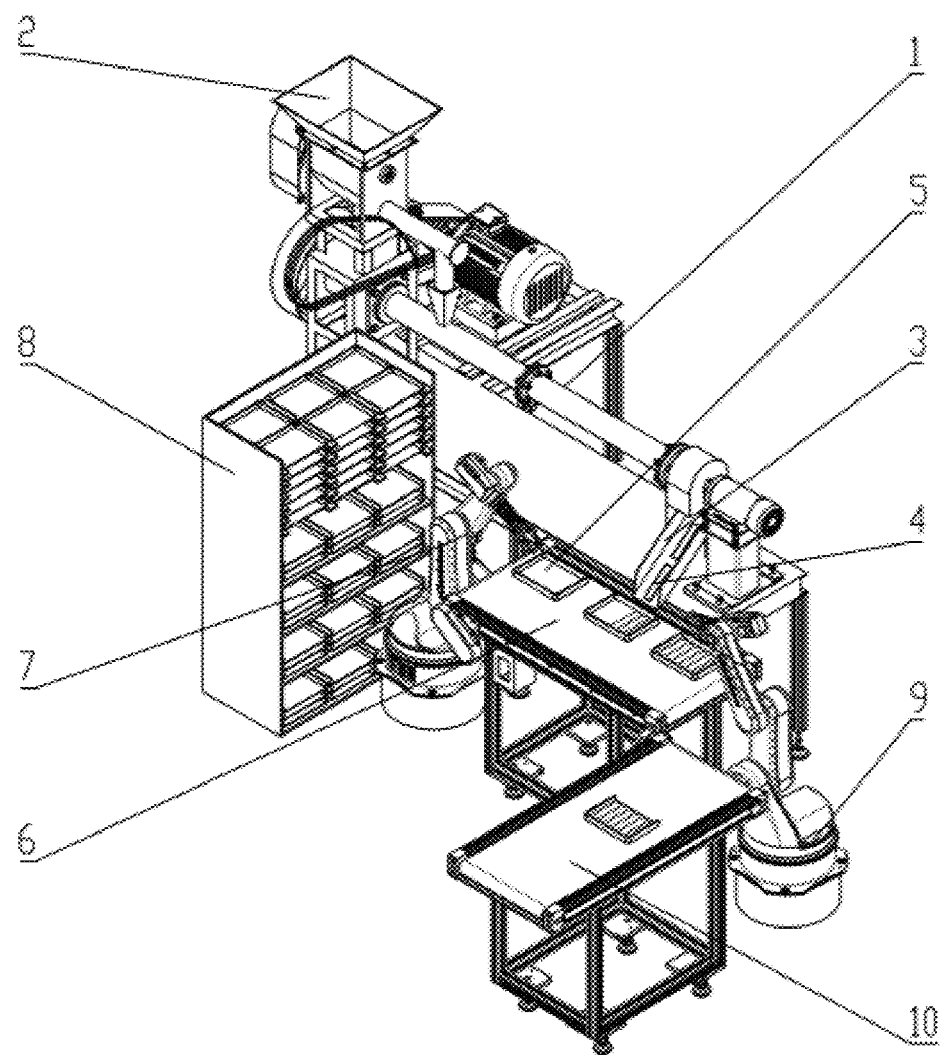
FIG. 2 is a schematic view of a first production area of Example 1.

As shown in FIGS. 1-2, FIG. 1 is a general schematic diagram of the present disclosure, FIG. 2 is a schematic diagram of a first production area of the present disclosure, and the present example provides an automatic production line for manufacturing and processing plant protein meat, including an extrusion-expansion machine 1, a feeding opening 2, a discharging opening 3, plant protein meat raw material blocks 4, a bearing plate 5, a first conveying device 6, a first manipulator 7, a storage rack 8, a second manipulator 9 and a second conveying device 10. Raw materials are added from the feeding opening 2 of the extrusion-expansion machine 1 and are processed via the extrusion-expansion machine 1, and then the plant protein meat raw material blocks 4 are produced from the discharging opening 3 of the extrusion-expansion machine 1. While the plant protein meat raw material blocks 4 are produced on the extrusion-expansion machine 1, the first manipulator 7 clamps the bearing plate 5 on the storage rack 8 and places the bearing plate onto the first conveying device 6, and the first conveying device 6 conveys the bearing plate 5 to the discharging opening 3 of the extrusion-expansion machine 1. The conveying speed of the first conveying device 6 is matched with the speed of the plant protein meat raw material blocks 4 sliding out of the discharging opening 3, so that the bearing plate 5 is uniformly loaded with the plant protein meat raw material blocks 4 fully. The second manipulator 9 clamps the bearing plate 5 loaded with the plant protein meat raw material blocks 4 fully and places the bearing plate onto the second conveying device 10. The second conveying device 10 conveys the bearing plate 5 loaded with the plant protein meat raw material blocks 4 fully to the third conveying device 12.

Figure 3:
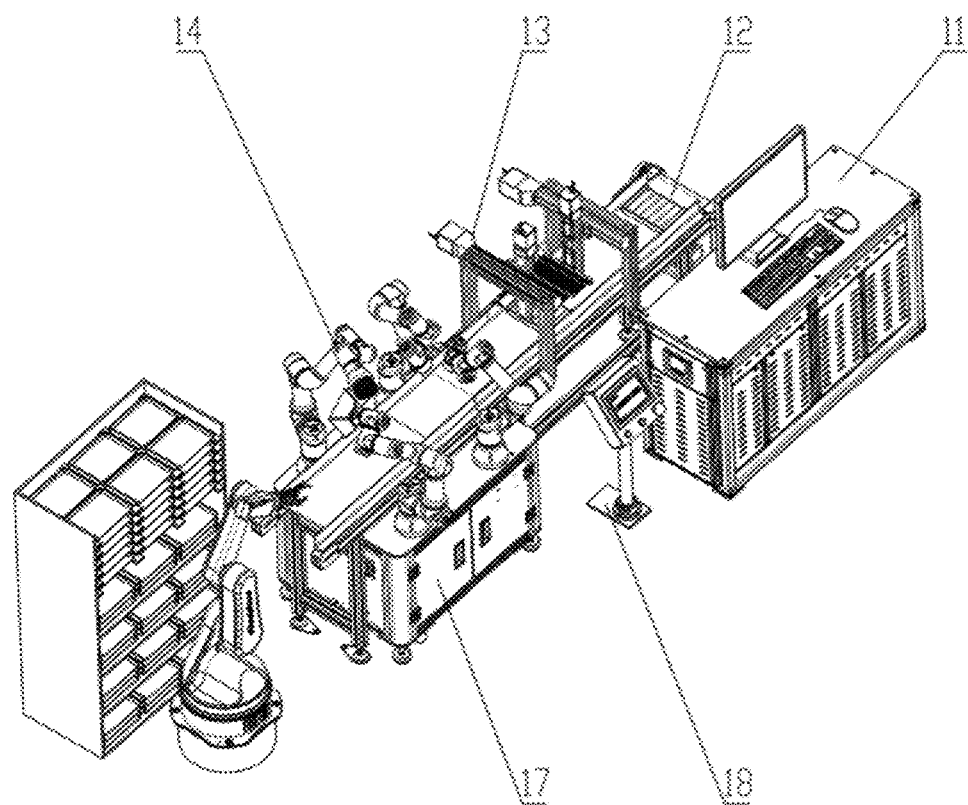
FIG. 3 is a schematic view of a second production area of Example 1.

As shown in FIG. 3, a schematic diagram of a second production area of the present disclosure, a main console 11, a third conveying device 12, a shredding device 13, a seasoning adding and mixing device 14, a storage cabinet 17 and a secondary console 18 are included. In the second production area, the plant protein meat raw material blocks 4 produced in the first production area are shredded and subjected to seasoning adding and mixing treatment.

Figure 4:
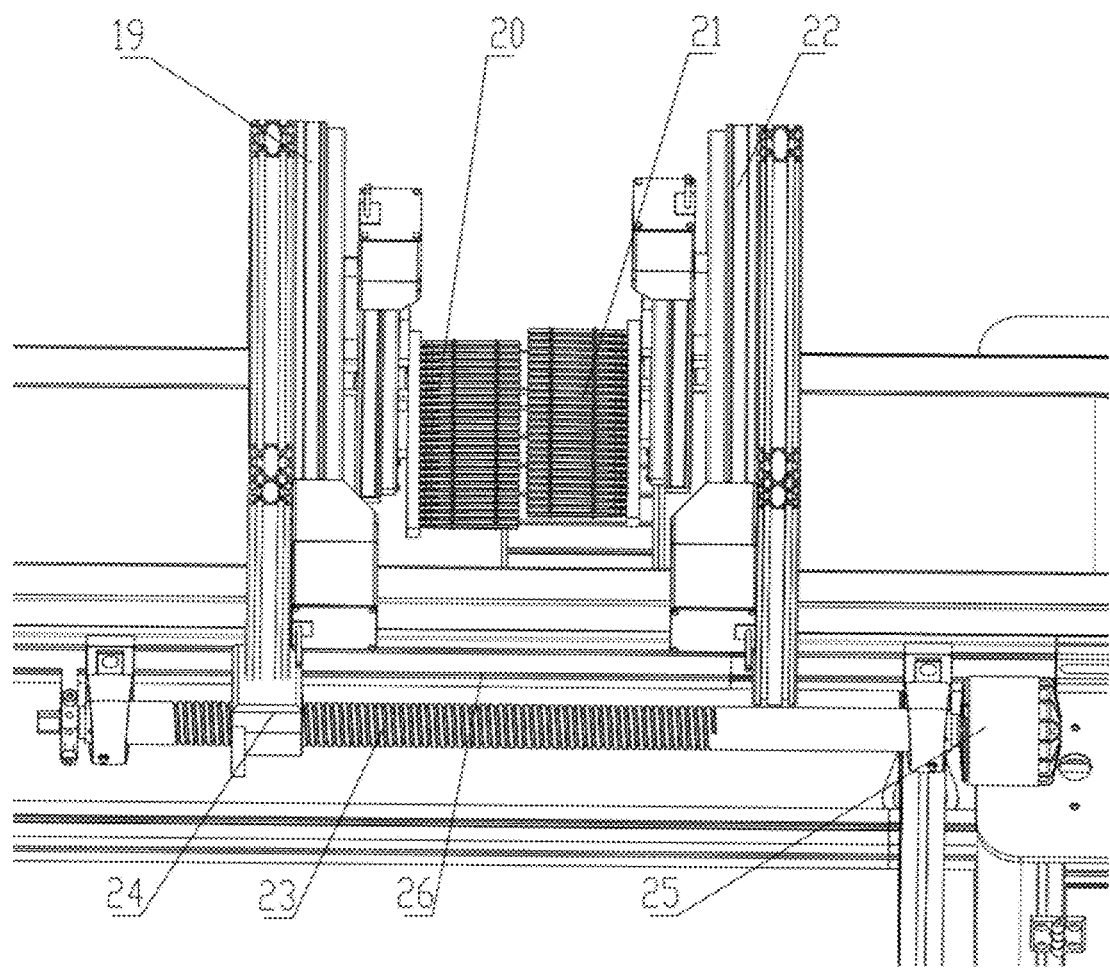
FIG. 4 is a schematic view of a shredding device of Example 1.
Figure 5:
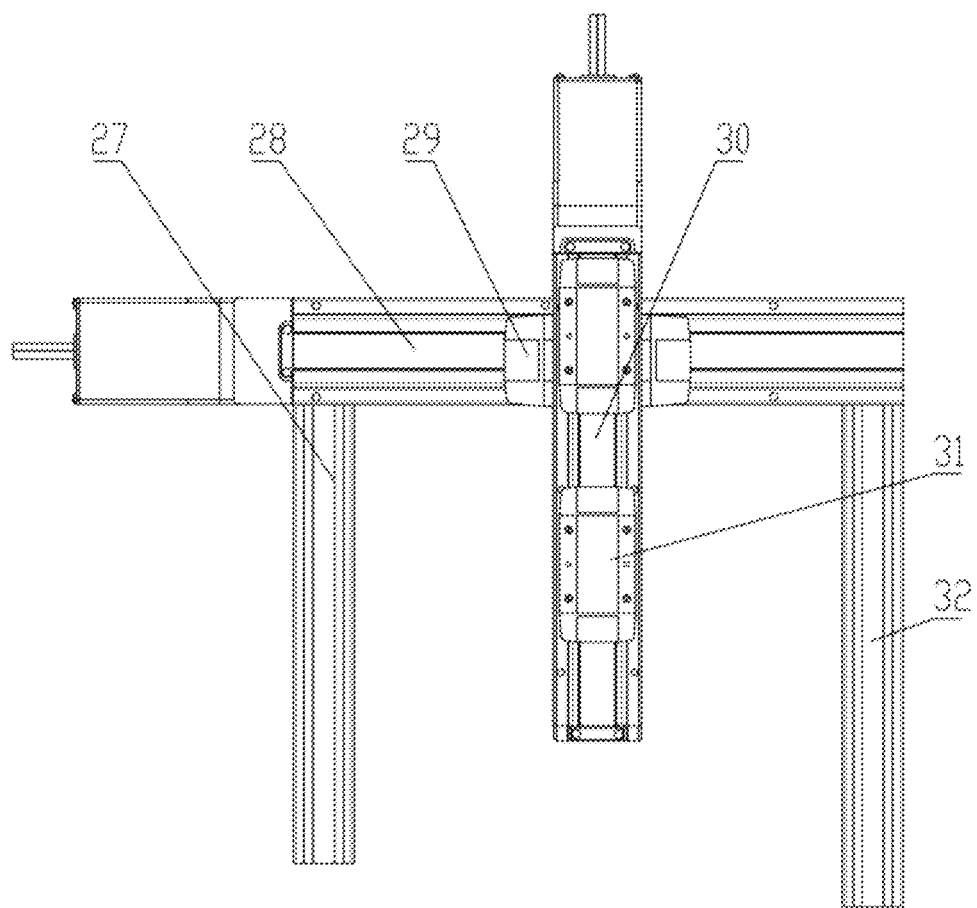
FIG. 5 is schematic view of a truss of Example 1.
Figure 6:
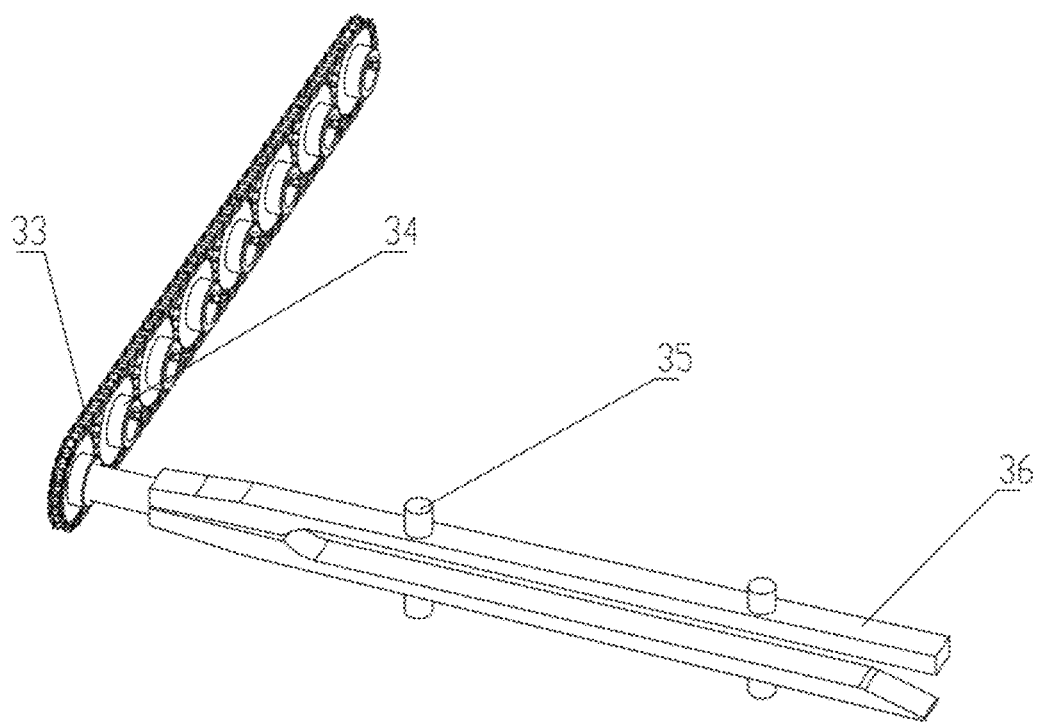
FIG. 6 is a schematic view of a clip rotating device of Example 1.

As shown in FIGS. 4-6, the shredding device 13 includes a first truss 19, a first clip row 20, a second clip row 21, a second truss 22, a horizontal lead screw assembly 23, a sliding block 24, a motor 25 and a horizontal sliding groove 26. The truss includes a first stand column 27, a horizontal sliding track 28, a horizontal sliding block 29, a vertical sliding groove 30, a vertical sliding block 31 and a second stand column 32. Each clip rotating device includes a chain 33, a gear 34, an electromagnet 35 and a clip 36. The second truss 22 is welded to the third conveying device 12, the first truss 19 is matched with the horizontal sliding groove 26 through the second stand column 32 and moves on the third conveying device 12; and the first stand column 27 is matched with the sliding block 24 to enable the first truss 19 to be connected to the horizontal lead screw assembly 23. The horizontal lead screw assembly 23 drives the sliding block 24 to move in the horizontal direction through the motor 25, so that the first truss 19 is driven to move in the horizontal direction.

Shredding Process:

When the third conveying device 12 conveys the bearing plate 5 loaded with the plant protein meat raw material blocks 4 fully to the shredding device 13, the horizontal sliding block 29 moves on the horizontal sliding track 28 left and right so that the second clip row 21 is aligned with the bearing plate 5 in the left-right direction, the vertical sliding block 31 downwards moves on the vertical sliding groove 30, then the lower ends of the clips 36 of the second clip row 21 are aligned with the lower ends of the plant protein meat raw material blocks 4, along with continuous transmission of the third conveying device 12, the plant protein meat raw material blocks 4 are shoveled into the clips 36, and a 30° sharp corner is arranged at the front end of a lower clamping plate of each clip so that the plant protein meat raw material blocks 4 smoothly slip into the clip rows. The electromagnets 35 start all the clips 36 of the second clip row 21 to clamp the plant protein meat raw material blocks 4. The vertical sliding block 31 moves upwards to drive the second clip row 21 to move to the same horizontal height as the first clip row 20. The sliding block 24 drives the first truss 19 to get close to the second truss 22 till the first clip row 20 clamps all the plant protein meat raw material blocks 4. Then the first clip row 20 moves upwards, and the second clip row 21 moves downwards. By up-down staggered movement of the first clip row 20 and the second clip row 21, the plant protein meat raw material blocks 4 are shredded. Then the motor drives one gear 34 to rotate so as to drive the chain 33 to run, the chain 33 runs to drive the other gears 34 to rotate so as to drive all the clips 36 in the first clip row 20 and the second clip row 21 to rotate by 90 degrees. After all the clips 36 rotate by 90 degrees, the first clip row 20 descends to be located on the same horizontal plane as the second clip row 21. The electromagnets 35 release all the clips 36, and after the plant protein meat raw material blocks 4 are shredded, formed raw material shreds drop on the bearing plate 5. The third conveying device 12 conveys the bearing plate 5 loaded with the raw material shreds to the seasoning adding and mixing device 14.

Figure 7:
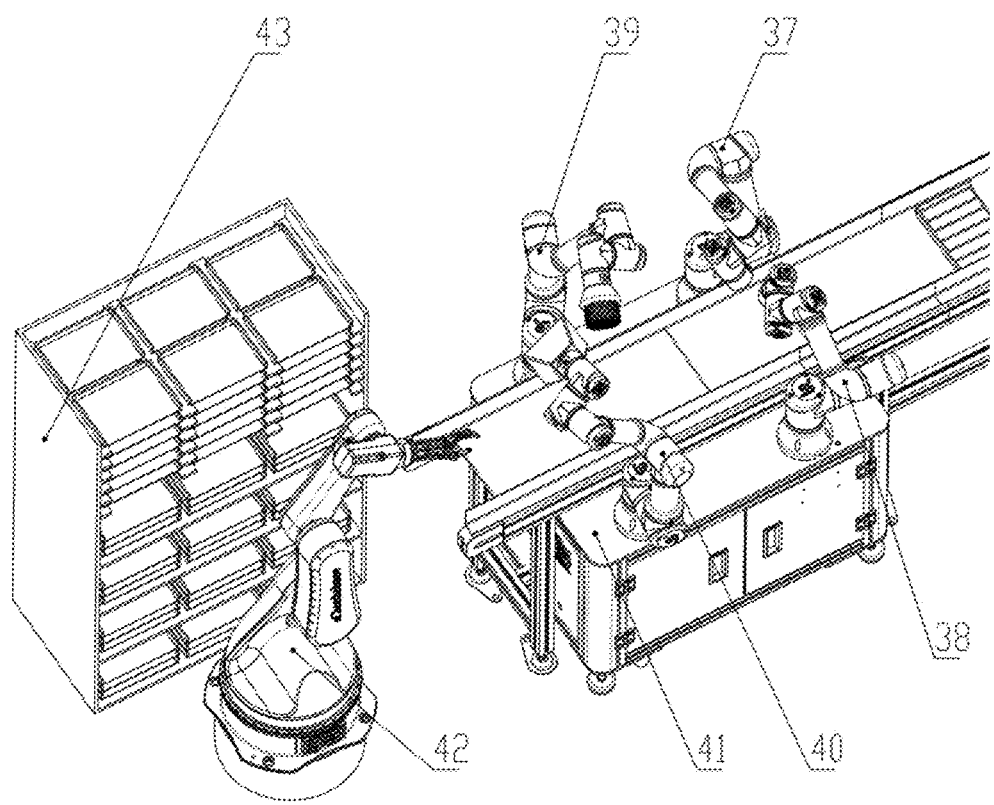
FIG. 7 is a schematic view of a seasoning adding and mixing device of Example 1.
Figure 8:
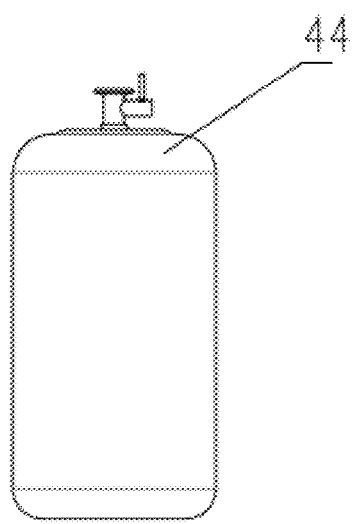
FIG. 8 is a schematic view of a seasoning tank of Example 1.
Figure 9:
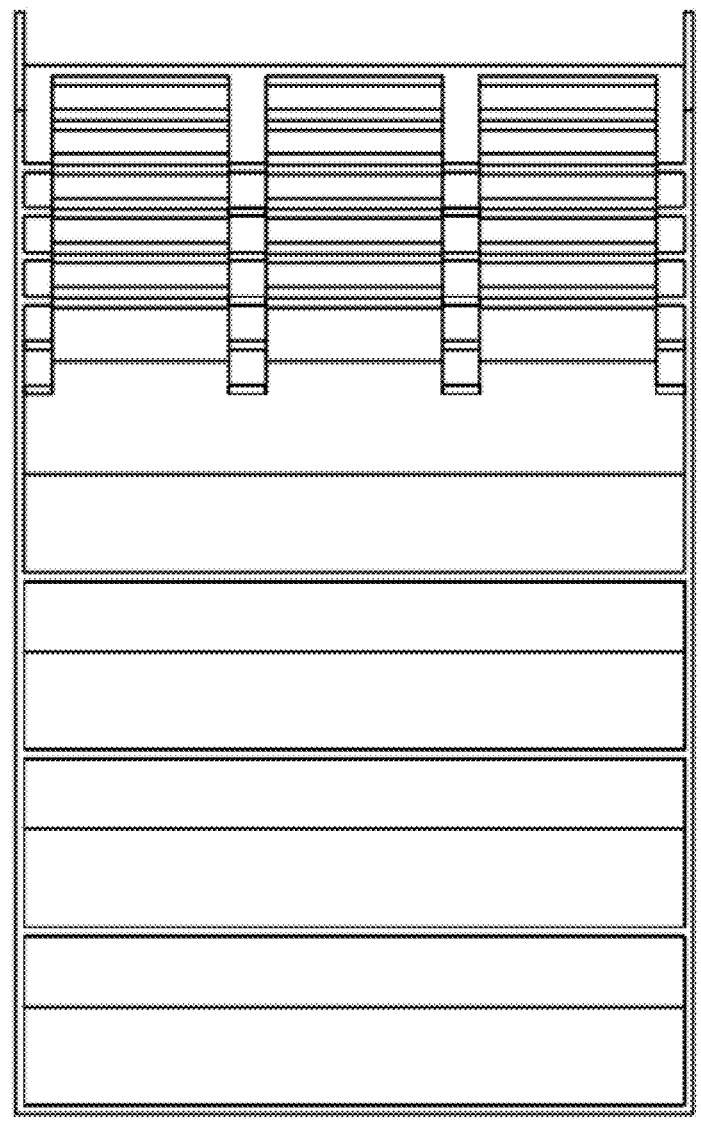
FIG. 9 is a schematic view of a storage rack of Example 1.

As shown in FIGS. 7-9, schematic diagrams of the seasoning adding and mixing device 14 of the present disclosure, a wet seasoning manipulator 37, a dry seasoning manipulator 38, a brush manipulator 39, a pressing plate manipulator 40, a manipulator bearing table 41, a third manipulator 42 and a recycling rack 43 are included. The wet seasoning manipulator 37, the dry seasoning manipulator 38, the brush manipulator 39 and the pressing plate manipulator 40 are mounted on the manipulator bearing table 41, a round hole is formed in the bottom of each manipulator and is connected to the storage cabinet 17, and two seasoning tanks 44 are placed in the storage cabinet 17. The two seasoning tanks 44 are separately loaded with wet seasonings and dry seasonings. The wet seasoning manipulator 37 and the dry seasoning manipulator 38 are connected to the seasoning tanks 44 through the round holes in the bottoms so as to suck seasonings. The wet seasoning manipulator 37 and the dry seasoning manipulator 38 separately spray the wet seasonings and the dry seasonings to the bearing plate 5 loaded with the raw material shreds. The brush manipulator 39 brushes the raw material shreds with the seasonings to enable the seasonings and the raw material shreds to be mixed fully and uniformly. The pressing plate manipulator 40 presses the raw material shreds and the seasonings to enable the raw material shreds to be mixed with the dry seasonings and the wet seasoning more tightly. Finally, the third manipulator 42 moves the bearing plate 5 loaded with the raw material shreds added with the seasonings to the recycling rack 43. The wet seasoning manipulator 37, the dry seasoning manipulator 38, the brush manipulator 39 and the pressing plate manipulator 40 may be cooperative manipulators, the wet seasoning manipulator 37 and the dry seasoning manipulator 38 are connected to the seasoning tanks through mounting guide pipes, the seasoning tanks 44 outwards spray the seasonings by pressure regulation, the manipulators control the positions of spraying openings to suck the seasonings, the brush manipulator 3 is provided with a brush, and the pressing plate manipulator 40 is provided with a pressing plate.

In the present disclosure, by mutual cooperation of the extrusion-expansion machine 1, the shredding device 13, the seasoning adding and mixing device 14, the conveying devices and the manipulators, production, shredding and seasoning adding of the plant protein meat raw material blocks are realized, and the fiber structure of the meat is not destroyed while the plant protein meat raw material blocks are shredded. Meanwhile, the raw materials and auxiliary materials are mixed and then are processed into plant protein meat in a specific shape.

Example 2

A rotating device at the tail end of each clip in the present example is a gear assembly, gears in the gear assemblies on the same clip row are engaged with one another, a rotating shaft of at least one gear on the same clip row is connected to an output shaft of the motor, and under the driving of the motor, the clips on the same clip row may rotate synchronously.

The scope of protection of the present disclosure is not limited to the above examples, and any modifications, equivalents, improvements and the like made by those skilled in the art within the spirit and principle of the inventive concept should be included in the scope of protection of the present disclosure.

What is claimed is:

1. An automatic production line for manufacturing and processing plant protein meat, comprising an extrusion-expansion machine (1), a first conveying device (6), a second conveying device (10), a third conveying device (12), a shredding device (13) and a seasoning adding and mixing device (14), wherein the third conveying device (12) is provided with the shredding device (13) and the seasoning adding and mixing device (14), a feeding opening (2) is formed above the extrusion-expansion machine (1), and a discharging opening (3) of the extrusion-expansion machine (1) is positioned above the first conveying device (6);

wherein the shredding device (13) comprises a first truss (19), a first clip row (20), a second clip row (21), a second truss (22), a horizontal lead screw assembly (23), a sliding block (24), a motor (25), a horizontal sliding groove (26) and clip rotating devices; the first truss (19) or the second truss (22) comprises a first stand column (27) and a second stand column (32); and the horizontal sliding groove (26) is positioned on the third conveying device (12), and the first truss (19) moves on the third conveying device (12) by cooperation of the second stand column (32) and the horizontal sliding groove (26); the first stand column (27) is matched with the sliding block (24) so that the first truss (19) is connected to the horizontal lead screw assembly (23), and the horizontal lead screw assembly (23) drives the sliding block (24) to move in the horizontal direction by means of a motor (25) arranged at one end of the horizontal lead screw assembly (23), so that the first truss (19) is driven to move in the horizontal direction; and two clip rotating devices are arranged, are respectively connected with the first truss (19) and the second truss (22), and repeatedly move on the first truss (19) and the second truss (22) in the up-down direction or the left-right direction.

2. The automatic production line for manufacturing and processing the plant protein meat according to claim 1, wherein each clip rotating device comprises a chain (33), gears (34), an electromagnetic valve (35) and clips (36), there are a plurality of gears (34), the clips (36) are connected to the gears (34), and the chain (33) is tensioned on the gears (34).

3. The automatic production line for manufacturing and processing the plant protein meat according to claim 2, wherein each of the clips (36) is divided into a fixed end and a clamping end used for clamping raw materials, each fixed end is embedded in the center of its corresponding gear (34), and each clamping end comprises an upper clamping plate and a lower clamping plate.

4. The automatic production line for manufacturing and processing the plant protein meat according to claim 3, comprising a storage rack (8), wherein a bearing plate (5) is stored on the storage rack (8), and the storage rack (8) is divided into an upper portion and a lower portion.

5. The automatic production line for manufacturing and processing the plant protein meat according to claim 4, further comprising a first manipulator (7), wherein the first manipulator (7) is used for placing the bearing plate (5) in the storage rack (8) onto the first conveying device (6).

6. The automatic production line for manufacturing and processing the plant protein meat according to claim 5, wherein the second conveying device (10) is connected to the third conveying device (12), the storage rack (8) and the first manipulator (7) are positioned at one end of the first conveying device (6), a second manipulator (9) is arranged between the other end of the first conveying device (6) and one end of the second conveying device (10), and the second manipulator (9) is used for transferring the bearing plate (5) conveyed to the other end of the first conveying device (6) onto the second conveying device (10).

7. The automatic production line for manufacturing and processing the plant protein meat according to claim 6, further comprising a recycling rack (43) and a third manipulator (42), wherein the recycling rack (43) and the third manipulator (42) are positioned at a tail end of the third conveying device (12), and the third manipulator (42) is used for placing the bearing plate (5) conveyed to the tail end of the third conveying device (12) onto the recycling rack (43).

8. The automatic production line for manufacturing and processing the plant protein meat according to claim 7, further comprising a main console (11) and a secondary console (18), wherein the main console (11) and the secondary console (18) are positioned on one side of the third conveying device (12).

9. The automatic production line for manufacturing and processing the plant protein meat according to claim 8, wherein each of the first truss (19) and the second truss (22) is provided with a horizontal sliding track (28), a horizontal sliding block (29), a vertical sliding groove (30) and a vertical sliding block (31); and the vertical sliding groove (30) is matched with the vertical sliding block (31).

10. The automatic production line for manufacturing and processing the plant protein meat according to claim 9, wherein the clip rotating devices are connected to the vertical sliding block (31), the vertical sliding block (31) moves on the first truss (19) up and down through the vertical sliding groove (30), and the horizontal sliding blocks (29) is connected to the first truss (19) and the second truss (22) respectively through the horizontal sliding tracks (28).

11. The automatic production line for manufacturing and processing the plant protein meat according to claim 3, wherein electromagnets (35) are separately arranged on the upper clamping plates and the lower clamping plates of the clamping ends of the clips (36).

12. The automatic production line for manufacturing and processing the plant protein meat according to claim 11, wherein a sharp corner is arranged at a front end of each lower clamping plate.

13. The automatic production line for manufacturing and processing the plant protein meat according to claim 12, wherein an included angle between an inclined plane of each sharp corner and a bottom face of a corresponding lower clamping plate is 30°.

14. The automatic production line for manufacturing and processing the plant protein meat according to claim 2, wherein the gears (34) connected to the first clip row (20) are engaged with one another, and the gears (34) connected to the second clip row (21) are engaged with one another.

15. The automatic production line for manufacturing and processing the plant protein meat according to claim 1, wherein the extrusion-expansion machine (1) is a double-screw extrusion-expansion machine.

16. The automatic production line for manufacturing and processing the plant protein meat according to claim 1, wherein the seasoning adding and mixing device (14) comprises a seasoning adding mechanical arm, a brush manipulator (39), a pressing plate manipulator (40), a manipulator bearing table (41) and seasoning tanks (44), the seasoning adding mechanical arm is connected to the seasoning tanks (44), the seasoning adding mechanical arm is used for adding seasonings into materials, the brush manipulator (39) is used for mixing seasonings on the materials, and the pressing plate manipulator (40) is used for pressing the materials to mix the seasonings with the materials.

17. The automatic production line for manufacturing and processing the plant protein meat according to claim 16, wherein the seasoning adding mechanical arm comprises a wet seasoning manipulator (37) and a dry seasoning manipulator (38), the seasoning tanks (44) comprise a wet seasoning tank and a dry seasoning tank, the wet seasoning manipulator (37) is connected to the wet seasoning tank through a pipeline, the dry seasoning manipulator (38) is connected to the dry seasoning tank through a pipeline, and the wet seasoning manipulator (37), the dry seasoning manipulator (38), the brush manipulator (39) and the pressing plate manipulator (40) are mounted on the manipulator bearing table (41).

18. The automatic production line for manufacturing and processing the plant protein meat according to claim 17, further comprising a storage cabinet (17), wherein the storage cabinet (17) is positioned below the third conveying device (12), the manipulator bearing table (41) is positioned above the storage cabinet (17), and the seasoning tanks (44) are positioned in the storage cabinet (17).

19. The automatic production line for manufacturing and processing the plant protein meat according to claim 18, wherein the wet seasoning manipulator (37), the dry seasoning manipulator (38), the brush manipulator (39) and the pressing plate manipulator (40) are arranged on two sides of the third conveying device (12).

\* \* \* \* \*